(12) United States Patent
Kulgemeyer et al.

(10) Patent No.: US 9,248,601 B2
(45) Date of Patent: Feb. 2, 2016

(54) METHOD FOR SETTING THE SIZES OF BLOWN FILM TUBES AS WELL AS A BLOWN FILM PLANT COMPRISING A CONTROL DEVICE FOR IMPLEMENTING SAID METHOD

(75) Inventors: Tobias Kulgemeyer, Hagen (DE); Ulrich Krause, Lienen (DE)

(73) Assignee: WINDMOELLER & HOELSCHER KG, Lengerich (DE)

(*) Notice: Subject to any disclaimer, the term of this patent is extended or adjusted under 35 U.S.C. 154(b) by 0 days.

(21) Appl. No.: 12/801,875

(22) Filed: Jun. 29, 2010

(65) Prior Publication Data

US 2011/0115111 A1    May 19, 2011

Related U.S. Application Data

(63) Continuation of application No. 11/988,631, filed as application No. PCT/EP2006/006873 on Jul. 13, 2006, now abandoned.

(51) Int. Cl.
| | | |
|---|---|---|
| *B29C 47/90* | (2006.01) | |
| *B29C 47/92* | (2006.01) | |
| *B29C 47/00* | (2006.01) | |
| *B29C 47/88* | (2006.01) | |

(52) U.S. Cl.
CPC ............ *B29C 47/92* (2013.01); *B29C 47/0026* (2013.01); *B29C 47/8825* (2013.01); *B29C 2947/926* (2013.01); *B29C 2947/9258* (2013.01); *B29C 2947/9259* (2013.01); *B29C 2947/92542* (2013.01); *B29C 2947/92619* (2013.01); *B29C 2947/92647* (2013.01); *B29C 2947/92923* (2013.01); *B29C 2947/92933* (2013.01)

(58) Field of Classification Search
USPC .............................. 264/40.1, 565; 1/40.1, 565
See application file for complete search history.

(56) References Cited

U.S. PATENT DOCUMENTS

| 4,189,288 A * | 2/1980 | Halter .......................... 425/72.1 |
| 4,246,212 A | 1/1981 | Upmeier et al. |
| 5,104,593 A | 4/1992 | Joseph |
| 5,288,441 A * | 2/1994 | Collins ......................... 264/410 |
| 5,676,893 A * | 10/1997 | Cree ............................. 264/40.1 |
| 6,254,368 B1 | 7/2001 | Shinmoto |
| 7,922,470 B2 * | 4/2011 | Joseph ......................... 425/72.1 |
| 2002/0076459 A1 * | 6/2002 | Joseph ......................... 425/72.1 |
| 2004/0113331 A1 * | 6/2004 | Miyata et al. ................. 264/573 |
| 2011/0115111 A1 * | 5/2011 | Kulgemeyer et al. ......... 264/40.3 |

FOREIGN PATENT DOCUMENTS

| DE | 2721609 | 11/1978 |
| EP | 0 522 278 A1 | 1/1993 |
| EP | 1 138 463 A2 | 10/2001 |
| EP | 1 488 910 A1 | 12/2004 |
| EP | 1 616 687 A1 | 1/2006 |
| JP | 1 275123 | 11/1989 |

* cited by examiner

*Primary Examiner* — Galen Hauth
(74) *Attorney, Agent, or Firm* — Jacobson Holman, PLLC.

(57) ABSTRACT

A method for setting the sizes of film tubes extruded by blown film plants includes changing the film tube size from an initial size to a final size, and optimizing the location of a frost area during the size change by setting the output of a cooling fan. Physical parameters of the initial and final size of the film tube are stored in a control device. The control device takes these physical parameters into account when generating control signals. The control signals form the basis for the control of the cooling fan output.

23 Claims, 3 Drawing Sheets

METHOD FOR SETTING THE SIZES OF BLOWN FILM TUBES AS WELL AS A BLOWN FILM PLANT COMPRISING A CONTROL DEVICE FOR IMPLEMENTING SAID METHOD

CROSS-REFERENCE TO RELATED APPLICATION

This application is a continuation application of U.S. application Ser. No. 11/988,631 filed Jan. 11, 2008, now abandoned the disclosure of which is incorporated by reference as if fully set forth herein. The predecessor application, U.S. application Ser. No. 11/988,631, is a nationalization of PCT/EP06/006873 filed Jul. 13, 2006, and published in German.

BACKGROUND OF THE INVENTION

1. Field of Invention

The invention relates to a method for setting the sizes of blown film tubes and a blown film plant comprising a control device for implementing said method.

2. Description of the Prior Art

Blown film plants have been disclosed in a number of patent applications (e.g. U.S. Pat. No. 5,288,219). Blown film plants are usually provided with cooling or temperature control devices. The purpose of these cooling devices, which usually include fans, is to cool the hot, freshly extruded plastic melt, and the film resulting from the melt after the cooling process.

The film tubes are often cooled both from the outside and from the inside. The internal film cooling involves certain technical problems since the freshly extruded film tubes often form a closed film bubble from which the cooling air must be evacuated.

In modern extrusion plants, the film material transitions from a plastic melt to a still very hot film usually shortly after the melt is extruded from an annular gap intended for this purpose. The location at which the melt is transformed to film is often incorrectly referred to as "frost line". In reality, this transition point is an annular region of the peripheral surface of the melt tube or film tube. This region has an absolutely significant expansion in the transport direction of the film tube, which expansion can range from a few millimeters to a few dozes of centimeters. In this region, the random macromolecules of the melt assume an at least partly organized or at least more organized crystallite structure. Although plastics do not undergo a prompt and defined phase transition, as is possible in the transition of water to ice, the properties of the film melt change due to this transformation into the still very hot film in a manner that is significant for film production. Thus, this transition decisively reduces the stretchability and increases the stability and resistance of the film material. The transition point mentioned above is referred to hereinafter as "frost area" due to the analogy drawn to the freezing of water.

Due to the change in the stretch behavior and resistance of the film during its passage through the frost area, the calibration baskets (see EP 1 488 910 A1), which are often used in the production of blown films, are mounted above the frost area or the location of the frost area is controlled by means of a variation in the cooling devices or temperature control devices such that the frost area is located below the calibration basket.

If the frost area wanders into the calibration basket, the latter could damage the film melt. It is also probable that the softer melt material forms a "bulge' before reaching the calibration basket. This means that the diameter of the tube before reaching the calibration basket is larger than that of the calibration basket. Machine operators counteract this likewise highly undesirable state by regulating the fans in order to adapt to the cooling behavior and internal pressure of the film bubble. The difficulties involved in this regulation of the fans and the reduced efficiency of this regulation often lead to a pumping behavior in the region of the "bulge" located upstream of the calibration basket. This pumping behavior results in considerable damage to the film or even a tear of the film bubble.

If a frost area is located too far ahead or excessively below the calibration basket, the film may not be stretched to the desired extent and thus may not achieve the desired size. Even in blown film plants without a calibration basket, the adjustment of the location of the frost area is of great significance.

The adjustment of the frost area during size changes, which are performed for completing a new order, poses a special challenge. The amounts of size settings in this connection are particularly large and exceed by several times the changes undertaken in regulating procedures during the processing.

In the case of a size change, in which important physical values change significantly between the initial size and the final size, it is very difficult to optimize the location of the frost area. The word "optimize" in this context is meant to connote that after a size change, the frost area can assume either a different position or the same position as the target position in the transport direction of the film tube. Often the target position of the frost area changes from one order to the other, thereby also necessitating a change in the position of the calibration basket.

SUMMARY OF THE INVENTION

Since a measurement of the position of the frost area according to the prior art proves to be very difficult at least in the case of many film materials, the machine operator performs this task by relying on his experience, instinct, and patience. Often the machine operator tries to feel (and thus almost measure) the location of the frost line, in particular, during the size change, in order to expediently set the fans by operating the control buttons or air flaps in the fan lines. These tasks are laborious and tedious. Low-quality film is produced if the position of the frost area is not optimized. It is therefore the object of the present invention to suggest a method for setting the sizes of film tubes, which are extruded by blown film plants, in which method the film tube size is changed from an initial size of a film tube to a final size of a film tube and in which method the location of the frost area is optimized during the size change by setting the output of the cooling fan, which method can be implemented more conveniently and rapidly by the machine operator.

This object is achieved by the fact that physical parameters of the initial and final size of the film tube are stored in the control device, the control device takes these physical parameters into account when generating control signals, these control signals form the basis of the control of the cooling fan output.

For purposes of the present application, the term "size change" is meant to connote a change in the physical parameters of the film bubble. These physical parameters especially include the diameter of the film bubble (to be measured possibly at the frost area or in the calibration basket; however, determined usually subsequently over the width of the flattened film tube), which naturally leads to a change in the surface area of the film. Another important physical parameter is the (mass) flow rate of the extrusion plant per unit of time. Also the take-off speed can change and can be an important physical parameter. Naturally, a change in the film material, which would be construed at first glance to be a chemical change, also leads to a change in the physical parameters such as the extrudate temperature, the temperature at which the frost area is crossed, the heat capacity of the film etc. These variables can also be physical parameters as set forth in this application.

The word "parameters" is thus to be considered as a characterizing value, with the help of which it is possible to make statements about the structure and the productive efficiency of the extrusion plant. Such a physical parameter usually relates to or is a physical value, which can be quantified by a unit of measurement and measured value.

The size change can be brought about by means of a "deliberate" or "controlled" change, for example, in an order change. An example of a deliberate change would be a change implemented by a machine operator in one or more physical parameters during an order change. An example of a controlled change would be when the control device automatically implements such changes, for example, based on a stored work instruction. These types of size changes can be implemented both during the ongoing production and during shutdown of the extrusion plant.

However, a size change also occurs within the sense of the present application when control and regulating processes relating to physical parameters are performed within the ongoing production process. Such processes are usually initiated in order to keep the condition of the film and the entire production process within the ranges of tolerance around defined target values.

This form of change in the size of the film tube can also be initiated either automatically or by the machine operator. These changes are usually based on measured values, which relate to the location of the frost area by way of example. Therefore these changes can be referred to in the broadest sense as regulating processes for the size of the film tube. The order-related variant of the size change can be simply referred to as "order change" or "size change".

It should be understood that other physical values change as a result of the change in the afore-mentioned values. Examples of these other values include the film thickness, which depends on the extrudate flow rate per unit of time, the take-of speed, and the diameter of the film bubble.

All these and other values, which change in the case of order-related changes, can be construed as "physical values" as set forth in this application.

However, the method of the invention often makes do with a subset of all these values. It has been observed from theoretical and practical experiments that it is possible to dispense with some of the listed and actually changed values when implementing the method of the invention.

Furthermore, the word "control" is meant to connote a species of regulation. This means that the control system and the control signals within the sense of the present document can also be components of a regulation system.

The term "cooling fan output" is meant to connote the effect of the output of the cooling fan. This predominantly influences the airflow rate per unit of time. Usually, the airflow rate is influenced according to the prior art by means of flaps, which are mounted in or at the end of the fan lines and the position of which influences the air flow rate. In the method of the invention, it is particularly advantageous if the fan output is effected only by means of the rotational speed of the fans of one, more or even all the cooling blowers of the blown film plant. In this case, the supply of cooling air can be controlled without flaps. This results in a particularly constant course of change in the cooling fan output. A change in rotational speed can be implemented inter alia by changing the amount of torque-forming current, and also by means of brakes on the fans.

Physical parameters, which can be used to advantage for implementing the method of the invention, are also physical parameters of intermediate sizes. It is thus feasible, for example, for the control device to determine intermediate values between the initial size and final size during a change in the area of the film bubble and take them into account when generating the control signals.

The area of the film bubble, which can be derived in the known manner from related values such as the diameter of the film bubble, is actually among the more important parameters. In the case of the size of the film bubble, the area of that part of the film bubble is of particular interest, which stretches between the annular gap and the frost area (here, the target location) or, if so desired, between the annular gap and the calibration basket. Another very important parameter is the extrudate flow rate per unit of time.

One possibility of assigning control signals to the values of the physical parameters is to assign information to these values in databases. Those skilled in the art frequently refer to such databases as "calibration tables". The information can be data, which are taken as the basis when generating the control signals. However, the control signals themselves can also be stored in such a database.

The information can be determined empirically or by calculation. However, "mixed methods" are also often used. This means that based on empirical values, parameter changes are taken into account using analytical or numerical methods. However, it has been seen that when applying the method of the invention, good results are achieved if the control device further refines physical parameters directly with the help of calculation rules and thus takes them into account when generating the control signals.

In particular, in the case of a size change, which is brought about exclusively by an order change, the term "direct" in this context can be meant to connote that no measurements or the like takes place during or shortly before the size change. Instead, the machine control mechanism takes only physical parameters of the desired adjusted initial and final states as the basis for the change in the fan output (naturally, the initial states could also be measured here). In particular, such a method is advantageous in the case of the film area between the calibration basket or the frost area and the annular gap of the blow head and the physical values related to the area, such as height of the calibration basket.

In spite of all these positive findings, it is often advantageous if the machine operator implements additional adjustments—usually fine adjustments. This circumstance is inter alia due to the fact that usually not all physical parameters of complex interrelations can be taken into account in the method of the invention. Thus, for example, some changes in the environmental influences such as the ambient temperature and draft are absolutely influential on the location of the frost area. However, a static state, which greatly benefits the production of the film, is often set after a size change with or without additional adjustments implemented by the operator.

In the case of long production cycles, new fine adjustments are implemented repeatedly in order to cope with the change in environmental influences by way of example.

The static states achieved in this way are superbly suitable as an initial state for controlling the cooling fan output as suggested by the invention:

It has been seen that it is often more advantageous to implement the changes of the cooling fan output based on the actually adjusted initial state of the values of the cooling fan output instead of any calculated or empirically determined values stored in the memory of the control device. This circumstance is usually due to the afore-mentioned constant sensitive adaptation of the cooling fan output to varying external parameters.

The following should be noted about the advantages of flapless or valveless regulation in connection with the present invention:

The rapid regulation of the cooling fan output using flaps often obviously leads to extremely strong, often discontinuous changes in the cooling fan output, which can entail inter alia the following undesired developments:

an excessively rapid displacement of the frost line beyond the desired extent, a pumping behavior of the film bubble (addressed above) or a collapse of the film bubble.

It has been seen that even greater discontinuities can occur, for example, if phase transitions occur between laminar and turbulent flows as a result of activating the flap in the related airflow.

Experiments have proved that influencing the rotational speed at least of one ventilation rotor with the help of connectable means for dissipating and converting kinetic energy leads to a sufficiently rapid, but more continuous change in the cooling fan output.

The term "dissipation and conversion of kinetic energy" is meant to connote any measure that decelerates the rotation of the ventilation rotor.

The meaning of the word "connectable" should also be noted in this connection. The term means that "the means for dissipating and converting kinetic energy can be connected, if required".

The connectable dissipation and conversion of kinetic energy can also be effected in this context by means of mechanical brakes, which convert kinetic energy during a braking procedure into mechanical energy or by using friction into thermal energy by way of example. Eddy current brakes can likewise convert kinetic energy into thermal energy by induction and ohmic resistance. An inherent or permanent conversion of kinetic energy during operation (for example, by friction in the bearings of the ventilation rotor or by air resistance) is ruled out by the attribute "connectable".

In the case of ventilation rotors, which are driven using electric machines, it is advantageous if the engines comprise a power output controller, which can connect the electric machine such that the latter operates in the generator mode. In this situation, the rotor is decelerated and the kinetic energy of the rotor is converted into electrical energy. This electrical energy must be separated from the electric circuit of the related electric machine. This can be implemented by feeding this energy back into the electrical grid. For this purpose, another electronic device, often called output stage, can be provided. However, it has been seen that such feedback processes involve problems with electromagnetic compatibility in said electrical grid.

Another advantageous possibility involves "burning" the produced electricity by means of a braking resistor (conversion into thermal energy by resistance).

The supply of the "released" electric current (converted from the kinetic energy of the rotational movement) to another electric engine helps save energy. It is advantageous if the other electric machine is a machine element, which operates mainly in continuous operation and requires the most uniform electric power possible. A ventilation motor of the air-conditioning unit for the extruder hall can meet these requirements, in particular, in tropical countries.

Those electric machines must also be mentioned in this context, which participate in the external film cooling of the same or of another blown film plant. The motors of the extruder also operate uniformly during the continuous operation of the blown film plant.

Most braking procedures or regulating processes occur in the region of the internal film cooling, which is why all measures of the invention are recommended here the most. It is greatly advantageous to operate electric machines, which are assigned to the internal film cooling, with the help of the generator, if required, and to supply the acquired electricity to the motors of other fans.

In spite of the afore-mentioned disadvantages of controlling and regulating the cooling fan output and the flow of blow air by means of flaps, it may be advantageous to provide such control and regulation systems at the blown film plant and to use them, in particular, when implementing changes of large amounts.

In this connection, it is also possible to use the brakable ventilation rotors to implement compensatory measures in the case of extremely discontinuous changes in the cooling fan output. It is advantageous if at least one part of those plant components, the settings of which are changed during the size change, experiences these changes in a time-shifted manner. The related plant components can include all those devices using which physical parameters can be adjusted. However, the term "plant components" in this connection is particularly meant to connote those devices, which influence the extruded film tube directly or indirectly. These include the plant components, which are provided for calibrating and guiding the film tube and which often come into contact with the film or the film tube.

These devices include inter alia the calibration baskets or the supporting cage, the central bubble guide, the gusset-forming arrangement, the flattening device, and the squeezing device. These plant components are considered to be film-guiding elements even if, in the case of a part of these components, a direct contact between the film and the plant component is prevented by means of an air cushion by way of example. In the case of these components, the "change" in the related size change is particularly constituted by an adaptation of the plant components to suit the respective cross-section of the tube. For this purpose, for example, calibration baskets can also be provided, which can be changed "automatically" by the control device (by adjusting the inner diameter).

In addition to these tube-guiding plant components, other components also directly influence the freshly extruded film tube. These other plant components include the different inner and outer cooling devices. In these cooling devices, the change can be implemented usually in the physical parameter of air volume per unit of time or temperature of the cooling air. Blown film plants currently come equipped with a sequence of different inner and outer cooling devices. It is thus known to have two or more outer or inner cooling rings or other outer or inner cooling devices disposed one after the other in the transport direction of the film. It has likewise proved to be advantageous to vary those points in time, at which changes are implemented in the cooling fan output or air temperature, between these different cooling devices (cooling devices are plant components)—and to thus implement a time delay. The output of the fan assigned to the first outer cooling ring can thus be changed before that of the second, or the output of the entire internal film cooling can be changed before that of the external film cooling.

The term "time-delay" is used in the present document to mean that the change is implemented or is effective at different points in time. "Successive" is thus a species of "time-delay" and emphasizes a sequence.

It should be noted that different machine components are present on different blown film plants. Although one may often find only some of the components cited here, it is also possible to find a larger number or wider variety of components. It is particularly important for purposes of this application that these machine components influence the film and experience a change when changing the size of the film.

A time-shifted or successive change on the different plant components is particularly advantageous in the ongoing production process (here production of goods) since an abrupt change of all plant components can result in extremely large discontinuities. These discontinuities can trigger strong fluctuations of the physical parameters of the film, which then have to be corrected again. However, order changes can also be implemented while the blown film plant is extruding material. An order change implemented in this way is extremely advantageous if this enables a prevention of a tear in the film bubble and the associated time loss.

It has proved to be advantageous if the changes on the different plant components are implemented at least to a certain extent in the sequence in which these components influence the film (in the transport direction of the film). The film-guiding components naturally influence the film by virtue of their contact with or guidance of the film, while in the case of the cooling devices, the location of the maximum cooling effect is relevant.

Also the speed, at which the different plant components are adjusted in succession, can be correlated to the speed at which the film is conveyed "past" the respective components.

The deliberate or controlled size changes, which have been described above and implemented as a part of an order change or a regulating process, may cause the diameter of the extruded film tube to change such that the flattened film tube or the already cut web of flat film is too broad for the at least one winding station disposed downstream of the blown film plant. It is advantageous if the control device of the blown film plant emits a warning signal or an alarm in this case. For this purpose, it should be possible to inform this machine control system about the width of the winding station or enable a possible communication of these data between the control devices of the blown film plant and the winding station.

A long-term production of goods usually results in a stabilization of the underlying physical parameters. Those changes of the external circumstances (e.g. hall temperature) that cannot be suppressed completely can result in constant changes due to adjusting, control or regulating processes.

In spite of these circumstances, it is naturally the intention of every machine operator to achieve as fast as possible a production state, which is static to a certain degree and in which the physical parameters fluctuate only moderately around defined target values. However, tests have proved that for bringing about such a production state in the fastest possible way, it is necessary to set physical parameters, which differ from the target parameters of the goods production to a surprising degree (by surprising amounts).

It is therefore advantageous if at least two classes of physical parameters, each of which are assigned to defined final sizes, are stored in the control device, The first class of physical parameters comprising target values for the ongoing production process (goods production) of an order, and the at least one second class of physical parameters comprising target values for the start-up operation of the related order.

Several other stages of "start-up operation states" can also be defined, which are started successively by the machine control system. In the wording used in this document, several second classes of physical parameters would be stored in the control device. The application of this teaching, just as the teaching of all the sub-claims, is advantageous even if the output of one or different cooling fans is not changed based on the signals of the control device. The teaching of this document can be applied to advantage even if the cooling fan output can remain constant and changes can be implemented exclusively on other plant components or physical parameters.

In relation to deriving the target values for the start-up operation and production process, it must be repeated that these target values can be derived empirically or by calculation. The target values should be loaded in the control device of the blown film plant accordingly. In this context, it is advantageous to store formula-dependent start-up and production parameters or to provide calculation rules for determining the same.

The target values for the start-up operation can also be used if the blown film plant must be started up again as a result of a short standstill of the plant.

In the afore-mentioned case, it is of great advantage—with or without target values for the start-up operation, to provide the blown film plant with a type of "short-term memory", which automatically (regular automatic storage) or at the machine operator's instance precisely stores the current production parameters. In this way, for example, during goods production, the machine "notices" not only the general target values but also the currently adjusted physical parameters resulting precisely due to the afore-mentioned constant changes implemented by the adjusting, controlling or regulating processes.

If such a situation results in a deliberate (e.g. machine cleaning) or unintentional (e.g. unintentional tear in the film or power outage) shutdown, then the blown film plant can be started up immediately with the goal of achieving the parameter values that were optimized shortly before during continuous operation. This continuation of process saves tine, money, and if appropriate, highly-qualified human resources.

Additional exemplary embodiments of the invention are based on the present description and the claims.

BRIEF DESCRIPTION OF THE DRAWINGS

In the individual figures.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

Figure 1:
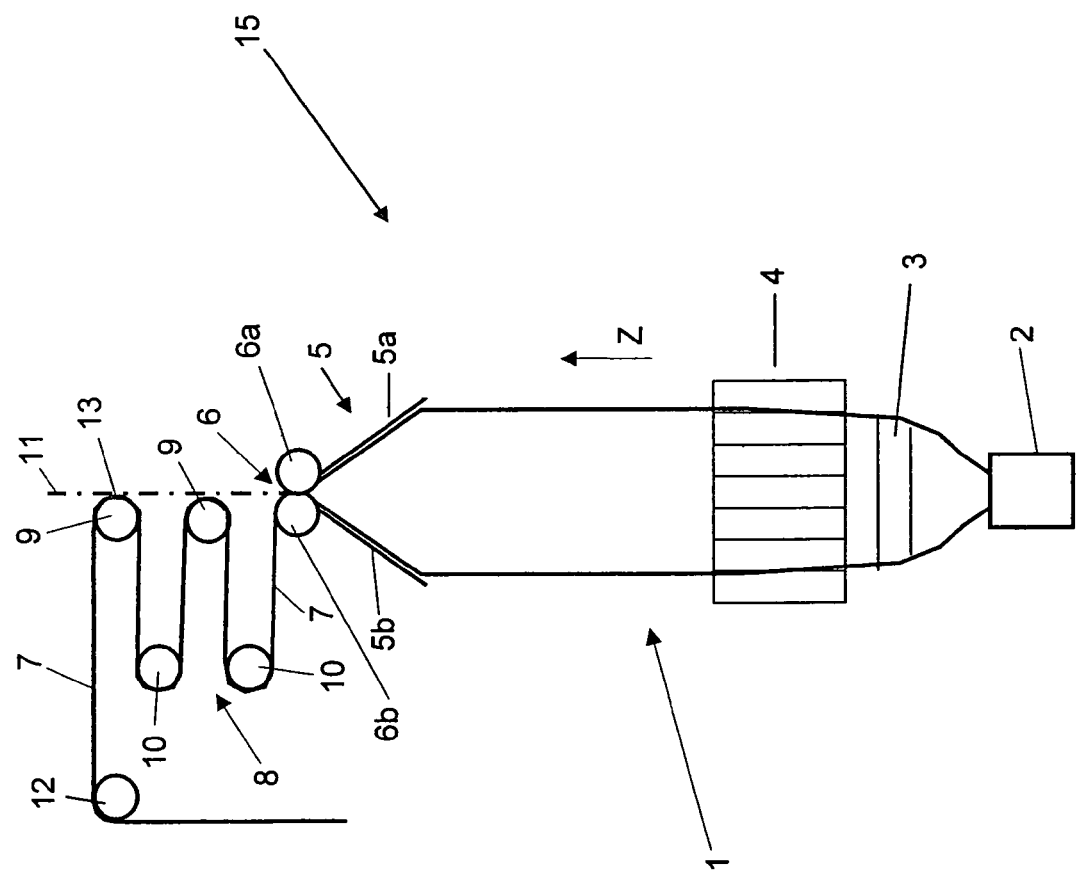
FIG. 1 is a sketch of a blown film plant

FIG. 1 shows a sketch of a blown film plant 15, in which a blown film tube 1 is extruded by a blow head 2 and conveyed in the conveying direction "z". The fan or cooling fans are not illustrated in FIG. 1. The material of the blown film tube 1 initially exists as a melt-like extrudate. However, in the frost area 3, the extrudate merges into a film, which then passes through the calibration basket 4. In the flattening device 5, the film tube is flattened between the flattening plates 5a and 5b and squeezed in the squeezing device 6 by the nip rolls 6a and 6b. The film tube then exists in the form of the flattened film tube 7. The latter passes through the reversing device 8, which is equipped with turning bars 10 and deviating rollers 9. The dash-dotted line 11 refers to the symmetry axis of the blown film tube 1. After its passage through the reversing device 8, the flattened film tube 7 is further conveyed by way of the transport roller 12. Usually, the flattened film tube is then supplied to a winding station.

Figure 2:
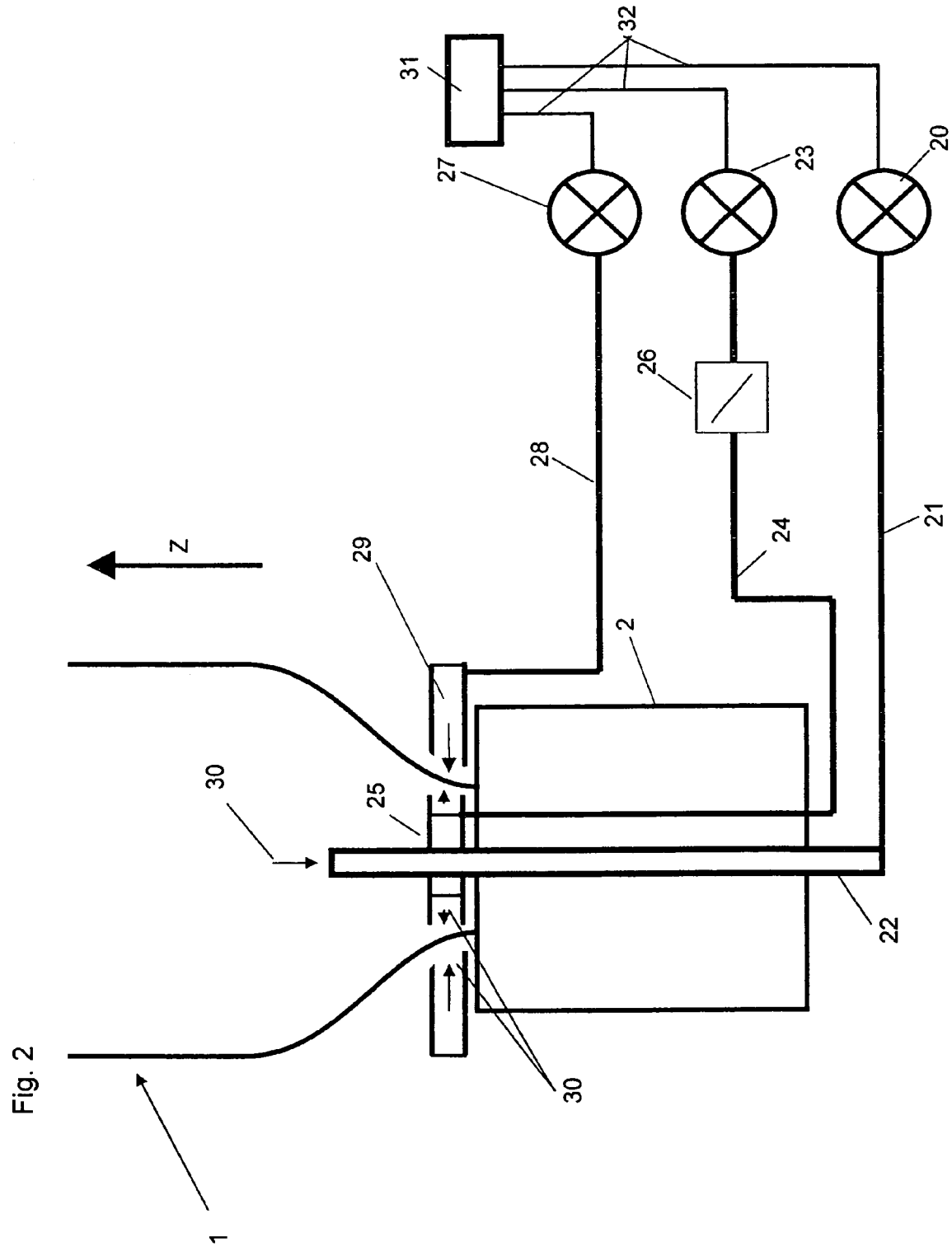
FIG. 2 is a sketch of a blow head

FIG. 2 shows different cooling fans that were not included in FIG. 1. The cooling fan 20 usually evacuates air from the interior of the film tube 1 by using the air vent 21 and vent pipe 22. The volume of air drained by this cooling fan 20 from the interior of the tube is substantially equal to that air volume per unit of time, which is fed by the cooling fan 23 to the inner cooling ring 25 by means of the air supply line 24 and blown from there into the interior of the film tube 1. The air supply line 24 is often provided with a flap device 26, which is used to control or regulate the air supplied into the interior of the film tube. The fan 27 supplies air by way of the air supply line 28 to the outer cooling ring 29, which extrudes the air onto the film tube 1. The different arrows 30 each indicate the direction of the air or airflow. The cooling fan output can be used to optimize the location of the frost line indicated by reference numeral 3 in FIG. 1. A strong cooling fan output results in the development of the frost line closer to the blow head 2. A reduction in the cooling fan output causes the frost area 3 to move toward the conveying direction "z" of the blown film tube. The cooling fan output can be influenced by the rotational speed of the fan wheels. However, it is also possible to use flaps 26 for this purpose. It has been shown that a variation in the rotational speed of the fans is advantageous when applying the method of the invention, since this enables a continuous control of the changes in the cooling airflow. In the method of the invention, the cooling fan output is controlled using the control device 31. In FIG. 2, the control device 31 is connected to the cooling fans 20, 23, and 27 by way of control lines 32.

Figure 3:
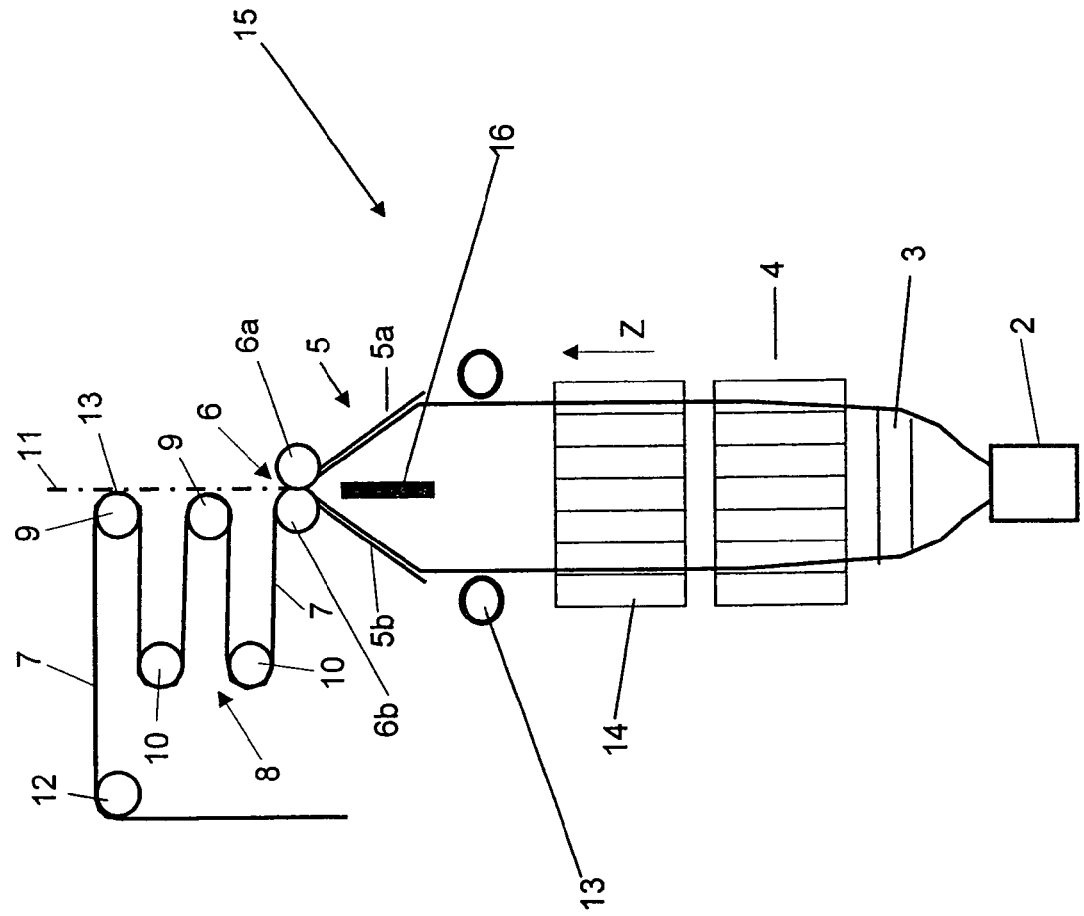
FIG. 3 is a sketch of a blown film plant including additional plant components

FIG. 3 shows another blown film plant as illustrated in FIG. 1. Like reference symbols have been used in FIG. 3 as in FIG. 1. However, FIG. 3 also shows additional plant components including the second calibration basket 14, the central bubble guide 13, and gusset-forming arrangement 16. The machine components together with those already illustrated in FIG. 1—namely, the first calibration basket 4, flattening device 5, and squeezing device 6 form the machine components guiding the film. Other plant components influencing the film are the cooling rings 29 and 25 shown only in FIG. 2. However, it is also possible for a plurality of such cooling rings to be disposed "upstream" or "downstream" in the conveying direction "z" of the film. A successive "change" or adjustment of all these plant components has proved to be advantageous. The sequence of these plant components may depend on the location of that zone of the film tube 1 that is influenced by respective machine component.

Against the background of the features already cited above, it is advantageous if all plant components in question can be automatically readjusted ("changed") and if the control device could effect this change.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference numerals | |
|---|---|
| 1 | Blown film tube |
| 2 | Blow head |
| 3 | Frost area |
| 4 | Calibration basket |
| 5 | Flattening device |
| 5a | Flattening plates |
| 5b | Flattening plates |
| 6 | Squeezing device |
| 6a | Nip roll |
| 6b | Nip roll |
| 7 | Film tube |
| 8 | Reversing device |
| 9 | Deviating rollers |
| 10 | Turning bar |
| 11 | Symmetry axis of blown film tube 1 |
| 12 | Transport roller |
| 13 | Central bubble guide |
| 14 | Second calibration basket |
| 15 | Blown film plant |
| 16 | Tube edge guide or gusset-forming arrangement |
| 17 | |
| 18 | |
| 19 | |
| 20 | Cooling fan |
| 21 | Air vent |
| 22 | Vent pipe |
| 23 | Fan mechanism |
| 24 | Air supply line |
| 25 | Inner cooling ring |
| 26 | Flap device |
| 27 | Fan |
| 28 | Air supply line |
| 29 | Outer cooling ring |
| 30 | Arrows for indicating the air flow |
| 31 | Control device |
| 32 | Control line |
| z | Conveying direction |

What is claimed is:

1. A method of setting a size of a film tube extruded by a blown film plant in which the size of the film tube is changed from an initial size to a final size, said method comprising:
   optimizing a location of a frost area during the size change by setting an output of at least one of a plurality of cooling fans;
   storing physical parameters of the initial and final size of the film tube in a control device; and
   generating control signals from the control device for controlling the output of the at least one of the plurality of cooling fans,
   the film tube size change being implemented in a time-shifted manner for components of the plant, each of which has a setting that can be changed, the setting change of each of the components being made successively in a sequence corresponding to the sequence in which the components of the plant influence the extruded film in a conveying direction (z) thereof.

2. The method according to claim 1, wherein the physical parameters include at least one of a surface area of the film tube, an extrudate flow rate per unit of time, a take-off speed, and a position of the frost area in the conveying direction (z) of the film tube.

3. The method according to claim 1, wherein the control device includes a memory that stores information assigned to defined values of the physical parameters, the stored information being utilized by the control device in generating the control signals.

4. The method according to claim 3, wherein the information stored in the memory is programmed based on empirical values, or is acquired by calculation.

5. The method according to claim 3, wherein an arithmetic unit follows defined calculation rules to generate from the values of the physical parameters instructions for generating the control signals.

6. The method according to claim 1, wherein at least one of the plurality of cooling fans is connected without flaps to an air outlet thereof.

7. The method according to claim 6, wherein each of the plurality of cooling fans is connected without flaps to an air outlet thereof.

8. The method according to claim 1, wherein a machine operator implements adjustments of the cooling fan output after the control device uses the control signals to set values of the cooling fan output, which the control device associates with the final size of the film tube.

9. The method according to claim 1, wherein the size change is implemented during the extrusion of the film material in the blown film plant.

10. The method according to claim 1, wherein a period of time elapsing between the changes in the settings of the components of the plant corresponds to a period of time which a defined section of the film tube requires at a current plant speed for covering a distance between areas influenced by the components of the plant.

11. The method according to claim 1, wherein the components of the plant to which the changes are implemented in a time-shifted manner includes the plurality of cooling fans.

12. The method according to claim 1, wherein the control device emits a warning signal if a size change causes a width of a flattened film to exceed a maximum working width of a winding device.

13. The method according to claim 1, wherein at least two classes of the physical parameters are stored in the control device, with each of the at least two classes being assigned to defined final sizes, a first class of the physical parameters including desired values for ongoing production process of a film tube order, and a second class of the physical parameters including desired values for start-up operation of the order.

14. The method according to claim 1, wherein the physical parameters are stored temporarily before a temporary shut-down, and are either reset when production resumes, or form a basis for determining physical parameters for a start-up operation.

15. The method according to claim 1, further comprising a step of determining with the control device the physical parameters of intermediate sizes of the film tube based on the physical parameters of the initial and final sizes of the film tube.

16. The method according to claim 1, further comprising, upon a reduction in a speed of the cooling fans, operating associated fan motors in a generator mode to transform kinetic energy associated with a cooling fan rotor to electric current.

17. The method according to claim 1, further comprising assigning control signals to values of physical parameters of the film tube by assigning information to the values in a database.

18. A method of setting a size of a film tube extruded by a blown film plant having a plurality of process components in which the size of the film tube is changed from an initial extruded size to a final size, said method comprising the steps of:
  implementing the film tube size change in a time-shifted manner with the plurality of process components, each of which has a setting that can be changed,
  the plurality of process components including a plurality of cooling fans, and the step of implementing including
  (i) storing physical parameters of the initial and final size of the film tube in a control device and
  (ii) optimizing a location of a frost area in the film tube during the size change by generating control signals from the control device so as to set an output of at least one of the plurality of cooling fans,
  the step of implementing the film tube size change in the time-shifted manner with the plurality of process components being made based on the generated control signals associated with the plurality of cooling fans.

19. The method according to claim 15, wherein when determining the control signals, the control device accounts for cooling fan settings adjusted during the production of the blown film in the initial size.

20. The method according to claim 19, wherein when determining the control signals, the control device acts based on the cooling fan settings adjusted during the production of the blown film in the initial size and implements changes of the cooling fan settings based on the physical parameters of the final size of the film tube.

21. The method according to claim 18, wherein the step of implementing the film tube size change in the time-shifted manner includes successively changing the settings of the plurality of process components in a sequence that corresponds to the sequence in which the extruded film is conveyed therethrough.

22. The method according to claim 18, wherein the output of the at least one of the plurality of cooling fans that is set is at least one of a cooling medium flow rate or a cooling medium temperature.

23. The method according to claim 18, wherein the output is set by effecting a change in a rotational speed of at least one of the plurality of cooling fans.

* * * * *